United States Patent [19]

Schubert

[11] Patent Number: 4,796,873
[45] Date of Patent: Jan. 10, 1989

[54] ACTIVE VIBRATION ISOLATION SYSTEM
[75] Inventor: Dale W. Schubert, Sudbury, Mass.
[73] Assignee: Barry Wright Corporation, Newton Lower Falls, Mass.
[21] Appl. No.: 43,630
[22] Filed: Apr. 28, 1987

Related U.S. Application Data

[63] Continuation of Ser. No. 716,026, Mar. 26, 1985, abandoned.
[51] Int. Cl.$^4$ .................... F16M 1/00; F16M 13/00; B60G 17/00
[52] U.S. Cl. ................................ 267/136; 248/550; 267/64.16; 318/460
[58] Field of Search .................. 188/1.11, 180, 378; 267/136, 137, 140.1, 140.5, 64.15, 64.16, 64.25; 248/542, 550, 562, 636, 638; 280/707; 364/426, 431.07, 421, 422; 318/114, 460; 73/649, 654, 430; 367/185, 187; 91/361; 244/17.13, 17.27

[56] References Cited

U.S. PATENT DOCUMENTS

| | | | |
|---|---|---|---|
| 2,767,942 | 10/1956 | Lucien | 244/226 |
| 2,848,538 | 8/1959 | Rafferty | 318/651 |
| 2,942,807 | 6/1960 | Gallagher | 244/80 |
| 2,959,252 | 11/1960 | Jamieson | 188/276 |
| 3,017,145 | 1/1962 | Yarber | 244/111 |
| 3,424,407 | 1/1969 | Garrard et al. | 244/118.5 |
| 3,464,657 | 9/1969 | Bullard | 248/550 |
| 3,506,967 | 4/1970 | Davison | 73/654 X |
| 3,552,271 | 1/1971 | Suggs et al. | 91/361 X |
| 3,566,993 | 3/1971 | Leatherwood et al. | 188/379 |
| 3,606,233 | 9/1971 | Scharton et al. | 248/550 |
| 3,701,499 | 10/1972 | Schubert et al. | 188/1.11 X |
| 3,703,999 | 11/1972 | Forys et al. | 248/550 |
| 3,878,504 | 4/1975 | Sears | 367/187 |
| 4,057,212 | 11/1977 | Schubert | 248/550 |
| 4,279,192 | 7/1981 | Kleinwaks | 91/361 |
| 4,447,770 | 5/1984 | Shepherd | 318/649 X |

FOREIGN PATENT DOCUMENTS 1087208  10/1967  United Kingdom .

OTHER PUBLICATIONS

Transactions of the ASME Journal of Mech. Design, "Fail-Safe Vibration Control Using Active Force Generators", 81-DET085, Guntur and Sunkar, Nov. 1981.
Transactions of the ASME Journal of Engineering for Industry, "Theoretical & Experimental Investigation of Electrohydraulic Vibration Isolation Sys.", Paper #69-Vibr. 40, Schubert & Ruzicka Mar.-1969.
NASA Contractor Report, "Study of Active Vibration Isolation Systems for Severe Ground Transportation Environments", Calcaterra, Cavanaugh and Schubert, NASA Wash. D.C. Nov. 1969.
"Active Vibration Isolation of Human Subjects from Severe Dynamic Enviroments", Calcaterra and Schubert, Amer. Society of Mech. Engr., N.Y., N.Y. Mar. 30, 1969.
"Research on Active Vibration Isolation Techniques for Aircraft Protection", Calcaterra & Schubert, AMRL-TR-67-138, Aerospace Medical Research Lab, Dec. 1966.
"Active Vibration & Shock Isolation", Ruzicka, SAE Transactions, vol. 77, Society of Automotive Engineers, Inc 1969.
"Active Vibration Isolation of Aerial Cameras", PEPI, paper presented at the Institute of Environmental Sciences 14th Ann. Tech. meeting St. Louis, Mo. Apr. 30, 1968.
"Servo-Controlled Pneumatic Isolators–Their Properties & Applications", Kunica, paper presented at the Nov. 7-11 meeting of the Amer. Society of Mech. Engineers Chicago, Ill, Nov.-1965.

Primary Examiner—Andres Kashnikow
Assistant Examiner—Robert J. Oberleitner
Attorney, Agent, or Firm—Milton E. Gilbert

[57] ABSTRACT

An active force actuated vibration isolation system uses a velocity sensor in the form of a velocity-sensitive geophone to sense payload velocity and modifies the geophone signal to control the force applied to oppose the vibration. The modified signal effectively reduces the inherent resonant frequency of the geophone and avoids instability.

29 Claims, 4 Drawing Sheets

ACTIVE VIBRATION ISOLATION SYSTEM

This application is a continuation application of U.S. application Ser. No. 06/716,026, filed Mar. 26, 1985 now abandoned.

BACKGROUND OF THE INVENTION

This invention relates to vibration control and isolation systems and is related generally to applicant's prior U.S. Pat. No. 3,701,499 which discloses a variety of vibration control and isolation systems employing acceleration sensors and feedback loops containing signal components derived from acceleration and other quantities.

The systems described in applicant's prior patent suggest various electronic compensation circuits for feedback signals and also the possibility of employing velocity sensors. No system is shown or suggested which employs velocity sensor derived signals which are modified electronically to provide a vibration isolation system that reduces transmitted or induced vibrations by a large factor for all frequencies above an extremely low frequency, approaching zero, with stability assured for all frequencies.

The combination of passive and active vibration control systems has been analyzed in a paper by a Guntur and Sankar entitled "Fail-Safe Vibration Control Using Active Force Generators" published by the American Society of Mechanical Engineers in the transactions, Journal of Mechanical Design, Paper No. 81-DET-85. The generalized form of a combined active and passive system is illustrated in FIG. 3 of this article and the transmissability characteristic of a velocity analog force feedback system is shown in FIG. 4 for various values of gain. The description is with reference to the theoretical "sky-hook" damper without reference to the sensor for derivation of the velocity signal or the requirements for maintaining stability throughout the frequency range of operation.

SUMMARY OF THE INVENTION

The present invention provides for a vibration isolating system that operates in response to a velocity sensor providing a signal representative of velocity to an electronic circuit which is adapted to provide extremely high gain over all frequencies above the very low frequencies near zero frequency with provision to avoid instability at all frequencies by reducing the gain value to substantially less than unity at phase angles of ±180°. The system operates in the preferred form relative to a passive vibration isolation system thereby minimizing the requirements for substantial force application componants and the attendant bulk and expense of power amplifiers for their actuation. The system isolates the payload from the residual vibration that is transmitted by a conventional passive system with a consequent absolute vibration value far below that which is applied to the system by transmission of base motion or applied inertial forces.

The present invention provides a velocity feedback force actuated vibration isolation control system characterized by vibration transmission attenuation (i.e., vibration isolation) at substantially all frequencies and the absence of any substantial resonance response which results from the achievement of a high degree of stability at all frequencies such that base vibration transmission to the payload and oscillatory response to impulse loading are reduced by an order of magnitude or better relative to a passive isolation system of the same resonant frequency. The term "passive isolation system" as used herein refers to a conventional system designed specifically to remove seismic vibrations including industrial environment induced vibrations.

The principal object of the present invention is to provide a stable force feedback vibration isolation system using velocity sensing.

A further object is to provide velocity sensing in combination with signal processing in a vibration isolation system to provide reduced amplitude and lower resonant frequency of a payload due to transmitted or inertial excitations relative to passive systems while maintaining a high degree of stability over the required frequency range.

Another object is to provide an active system which combines passive and velocity force feedback components, and which exhibits both a reduced oscillatory amplitude and associated decay or setting by an order of magnitude relative to the passive system alone, in response to a steady state and/or transient excitation.

The above and other features of the invention including various novel details of construction and combination of parts will now be described with reference to the accompanying drawings, and pointed out in the claims. It will be understood that the particular vibration control system embodying the invention is shown and described by way of illustration only and not as a limitation. The principles and features of this invention may be employed in varied and numerous embodiments without departing from the scope of the invention.

DETAILED DESCRIPTION

Figure 1:
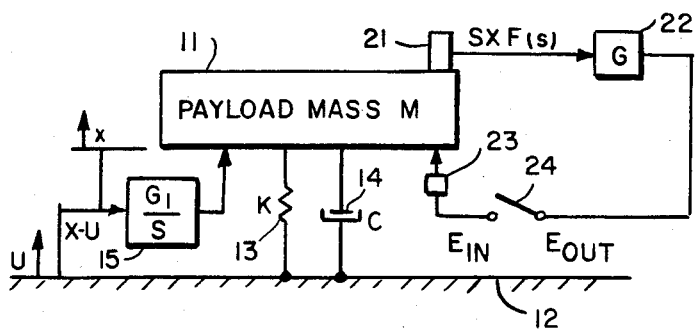
FIG. 1 is a schematic representation of a combined passive and velocity feedback force actuated vibration isolation system.

Referring to FIG. 1 a single degree of freedom velocity feedback force actuated vibration isolation control system will be described. In accordance with conventional representation for vibration isolation analyses the system shown in FIG. 1 has a payload mass M,11, supported with reference to a support structure 12 by a resilient spring 13 having a spring constant K and a viscous damper 14 having a damper coefficent C. The system is subject to disturbances which include: (a) base motion transmitted typically through support structure 12 to the payload mass 11, and (b) external forces applied directly to the payload mass 11.

Also shown in FIG. 1 is a position feedback system 5 which is generally responsive with slow response to the changes in the position of support 12 designated by quantity U and positions of the payload 11 designated by the quantity X, all in the vertical direction, which is the assumed direction of the degree of freedom involved, such that the output of a position servo 15 maintains spring 13 at approximately a predetermined compression level. For example, the system as thus far described could represent a work table isolated by passive isolation means 13-14 and maintained at a working level that is adjusted for changes in gross weight or the like.

In accordance with the present invention the payload mass 11 supported by support system 15 and passively damped by elements 13 and 14 is further isolated from vibrations whether they occur due to vibration transmitted from the support surface 12 or from impact or inertial forces that operate directly on the payload mass 11. This further isolation is achieved by a velocity feedback circuit stabilized to provide a counteracting force application applied to the payload mass 11 without the instability associated with oscillation, i.e. a realizable system.

The basic system of the invention comprises a velocity sensor 21 for developing an electrical signal representing an approximation of the velocity of payload mass 11 in the direction of the degree of freedom of motion. The velocity signal is applied through an electronic circuit 22 providing the necessary transfer function for controlling a force application unit 23 which applies a force $F_v$ to the payload mass M. The feedback from sensor 21 through circuit 22 to force generating unit 23 is negative such that the application of the force $F_v$ tends to cancel the velocity components which produces the output signal from transducer 21.

The selection of the velocity sensor 21 can be made from various known devices such as displacement, velocity and acceleration sensors per se where the displacement measuring transducer would require that the measured quantity be differentiated to obtain velocity and the accelerometer would require intergration to obtain the velocity quantity. Both of the sensors requiring this extra processing step have other limitations in terms of sensitivity and threshold response. In accordance with the invention the preferred form of transducer 21 is a unit known as the velocity sensor geophone.

Velocity sensitive geophones measure the relative velocity between the unit base or case of the sensor and a suspended mass called the proof mass. The sensor consists of a coil of wire containing many turns of very fine wire suspended on very linear and compliant springs within a magnetic field provided by a core and permanent magnet assembly. The motion to be measured is the velocity of the payload 11.

It was discovered however, that the electro-magnetic sensor actually measures the relative velocity of the proof mass relative to the case. The relative motion of the proof mass and case are determined by the dynamics of the suspended mass.

The geophone output voltage $E_v$ is proportional to the relative velocity. As will be readily understood by one skilled in this art, the sensor's electrical voltage response can be approximated mathematically, using Laplacian Notation, as follows:

$$E_v(s) = \beta S(X - Z) = \frac{\beta S^2(SX)}{S^2 + 2\zeta_g w_g S + w_g^2} \quad \text{(I)}$$

where $\beta \cong$ gain in units of volts per inch per second and is derived by the geophone calibration.
$S \cong$ Laplace Operator
$X \cong$ displacement of geophone case.
$Z =$ displacement of proof mass.
$S(X-Z) \cong$ relative velocity of proof mass to geophone case
$\zeta_g \cong$ Geophone fraction of critical damping.
$w_g \cong$ proof mass resonant frequency The geophone output response vector magnitude and associated phase angle are related to the actual velocity of the geophone case which is to be measured, SX. Converting Equation (I) to the frequency plane, the actual geophone output can be stated for our purposes as (where SX represents $\dot{X}$ in the time domain)

$$E_v(j\omega) \cong \beta \dot{X} \sqrt{\frac{w^4}{(w_g^2 - w^2)^2 + (2\zeta_g w_g \omega)^2}} \quad \text{(II)}$$

$$\theta = 180° - \text{Tan}^{-1}\left[\frac{2\zeta_g w_g w}{w_g^2 - w^2}\right] \quad \text{(III)}$$

where
$w \cong$ frequency
$\dot{X} \cong$ velocity to be measured

Equation (II) yields the output's vector magnitude and Equation (III) yields the associated phase angle.

The above frequency response equations indicate that the geophone response output signal can peak at the resonant frequency, $w_g$, if the fraction of critical damping is small. The fraction of critical damping is controlled by the magnitude of viscous damping. The viscous damping provided for the control of the output response at the resonant frequency comes from two sources. First, the proof mass coil suspension has some natural and inherent viscous damping caused by eddy currents flowing as the coil moves in the magnetic field. The inherent damping is not small and typically gives rise to a fraction of critical damping of about 0.3. Additional damping is easily added by placing a resistor across the output of the geophone. The presence of the damping resistor causes current to flow through the coil of wire as voltages are induced by coil movement in the magnetic field. The magnitude of this additional damping can be quite large. Preferably, the damping resistor is such that the overall function of critical damping is unity, or $\zeta_g = 1.0$. With this unity value the output voltage will not show a resonant peak and will exhibit a smooth curve transition into the operation region above the frequency $w = w_g$. In addition, for $\zeta_b = 1.0$ the transfer function given in Equation (I) may be factored into two poles as shown below:

$$E_v(s) = \beta S(X - Z) = \beta \left[\frac{S^2}{(S + w_g)(S + w_g)}\right] \dot{X} \text{ for } \zeta_g = 1.0 \quad \text{(IV)}$$

Importantly, the geophone output reponse modeled by this transfer function of Equation (IV) is not, as one can easily see, equal to the product of the gain and the measured velocity of the case. This product is further multiplied by the bracketed term to yield a more accurate and usable approximation of the actual geophone output. This transfer function, in its factored form, can be used to design an electrical processing network whose output can be fed back to provide active vibration isolation. Such a network will be described below.

Commercially available geophones include a wide variety of units with a wide range of signal capability, frequency response and cost. Typically the lowest frequency models are the most expensive. For applications in accordance with the invention it is desirable to have both small size and relatively low cost. Geophones for sensing velocity are commercially available which have response characteristics as described mathematically in Equation (IV). One suitable geophone is the model HS-1 manufactured by Geo Space Corporation, Houston, Tex.

Figure 9:
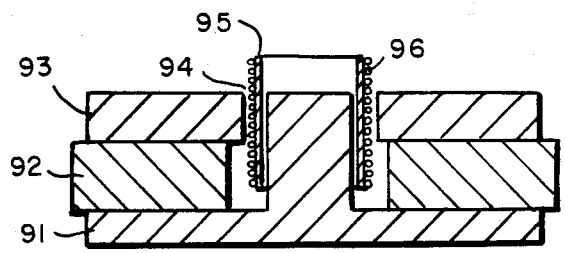
FIG. 9 is a sectional view showing the arrangements of parts in an electromagnetic force transducer.

The other transducer required for force actuator systems is the force generating unit 23 shown in FIG. 1. One practical form of this actuator is a modified high-fidelity loud speaker assembly chosen for its characteristics and availability to operate from a control system circuit using conventional integrated circuit elements. With these requirements in mind an assembly such as that illustrated in FIG. 9 was used. FIG. 9 shows a conventional speaker magnet voice coil assembly comprising a steel core 91, a permanent ferrite magnet 92 and an annular steel yoke 93 providing with the upright extension of core 91 an air gap 94. Mounted for movement within the air gap 94 is a non-metallic cylinder 95 on which a multiturn coil 96 is wound. The construction should provide:

(1) force output that is proportional to an input current (2) substantially frictionless motion in all axes of movement.

(3) little added spring stiffness to the spring rates provided by the passive vibration isolation system.

An integrated circuit power amplifier can meet the linear response requirement, number (1) above. These integrated circuit power amplifiers are small and inexpensive and very desirable to use when possible as final power output stages of a control system's electronic circuitry. For power level above twelve watts, or two amps output current, discrete power amplifiers must be made up from individual power transistors which greatly adds complexity and cost to the electrical control system circuitry.

Requirement No. 2 is quite important, since friction force levels can act as force noise sources leading to a higher payload output response level. Perhaps this can be best understood by way of example, Consider, using a 100-pound payload and an actuator for force generation having a friction force of say only 1/100 of one pound, could not control vibration acceleration response levels at the system output below the acceleration level in G units of $A_g = F/W = 0.01/100$ or $10^{-4}$ g units. However, the desired response level of the isolated payload is one Micro-G or less. To obtain a vibration level of less than one Micro-G, the force actuator friction level must be less than $1 \times 10^{-6}$ pounds per 100 pounds of payload weight that the actuator acts upon. Thus the friction requirement for the force actuator is extreme, essentialy the actuator must be frictionless.

The most effective manner to produce a substantially frictionless force transducer is to use a magnet and coil assembly from a high-quality loud speaker with a wider than normal gap for the coil to move within. One example, which worked acceptably was magnet used with a 10-inch high fidelity woofer loud speaker. One skilled in the art should understand that a commercially processed loud speaker may have to be adapted for use in accordance with the present invention. For example, the existing gap width might have to be increased.

After magnetization a voice coil was placed in the field to obtain a calibration scale factor for the force actuator. The calibration scale factor is an important design parameter yielding the overall loop gain and maximum force capabilities for the actuator. Typically, such axtuators are capable of providing two pounds of force per ampere of input current.

In the assembly of a velocity feedback, force actuated vibration isolation control system either the magnet or the coil may be rigidly attached to the payload with the remaining component rigidly attached to the isolation system base or cabinet structure.

Having discussed the sensing and actuating means, it is now timely to discuss the operation of the vibration isolation system. Critical to desired operation is a realizable system. This term, commonly used in servomechanical analysis, denotes the condition wherein the system is stable. To determine system stability, it is necessary to analyze and modify the system open loop transfer function.

In accordance with the present invention the stability of the velocity signal feedback loop is assured by selection of the transfer function G of the network 22 connecting the geophone 21 to the force transducer 23. Stability in such systems can be analyzed by opening the loop and determining the output voltage $E_o$ in response to a given input voltage $E_{in}$ as shown in FIG. 1, the ratio of which being called the open loop transfer function. The switch 24 is shown in FIG. 1 for purposes of this analyses and is not ordinarily required in an actual system.

If the network 22 has a transfer function which merely represents a high gain amplifier, instability results. Such instability is generally associated with excessive gain and $\pm 180°$ phase shift at some frequency of operation. The velocity sensed by the velocity sensor 21 will include the amplified vibration due to the resonance point of the passive vibration of the isolation system 13-14 and this frequency generally is near the resonant frequency of the geophone 21 itself. Finding the proper transfer function for the network 22 requires compensating for this effect.

Analyzing the phase and gain relationships shows that the amplification and phase shift at resonance of the passive vibration isolation system occurs at a frequency slightly lower than the geophone natural frequency. The geophone is very highly damped, as is explained above, with $\xi = 1.0$, and thus has no resonance amplification. If the geophone resonant frequency could be placed well below, say by a decade, the passive system resonance then the stability state will be vastly different. With a geophone resonance one decade or so lower in frequency than the passive system resonance, the open loop transfer function goes through nearly 180° of phase lag prior to the frequencies at which gains greater than unity exist, thereby allowing the open loop transfer function to pass through the $\pm 180°$ phase point with a gain substantially less than one. Typically, the gain at said point has been maintained at approximately 0.3.

For a low resonance frequency of the geophone relative to the passive system resonance, much more gain may be applied and still have a stable system. In general, the higher the velocity feedback gain, the higher the degree of vibration isolation. The highest possible gain is sought that will still yield a stable and well behaved active vibration isolation control system.

The process of closing the loop and obtaining a higher gain is called stabilization. To do this requires acting on the geophone electrical signal by linear or non-linear electrical networks as will now be described.

With reference again to FIG. 1, the transfer function of the geophone, F(s), may be factored as shown below for the condition of critical damping $\xi_g = 1.0$ $$F(s) = \frac{S^2}{(S + w_g)(S + w_g)} \quad \text{(V)}$$

Let the term $w_g$ or the geophone resonant frequency be expressed as a time period called a time constant such that $$T_g = \frac{1}{w_g}.$$

Placing this term into the geophone transfer function and rearranging terms gives the expression:

$$F(s) = \frac{T_g^2 S^2}{(1 + T_g S)(1 + T_g S)} \quad \text{(VI)}$$

Figure 2:
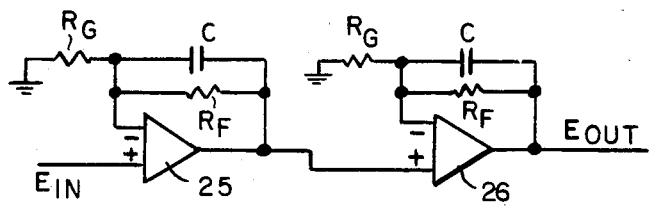
FIG. 2 is a partial schematic of a signal feedback circuit used in the system of FIG. 1.

A modified transfer function may be obtained by feeding the geophone electrical signal through an electronic network such as shown in FIG. 2. This network is two leg-lead networks using, for purposes of example, two operational amplifiers 25, 26 with feedback networks comprised of the two resistors $R_F$ and $R_g$ and the capacitor C.

The transfer function $g(s) = E_{out}/E_{in}$ for the circuit in FIG. 2 will now be determined In this circuit $R_f$, $R_g$, and C may be chosen such that the value of $R_P C$ (where $R_P$ is the parallel resistance of both the feedback, $R_f$, and ground "$R_g$ resistors) is equal to the geophone time constant $Y_g$. In addition, the value of $R_f$ is selected such that $R_f C$ has a value ten times greater than $R_P C$. With these values, the transfer function for the electronic compensator circuit 22 can be approximated as:

$$g(s) = \left(\frac{10 T_g}{T_g}\right)^2 \left[\frac{1 + T_g S}{1 + 10 T_g S}\right]^2 \quad \text{(VII)}$$

Now placing the above transfer function G(s) in series with function shown below:

$$F(s)g(s) = \frac{100 T_g^2 S^2}{(1 + 10 T_g S)(1 + T_g S)} \left[\frac{(1 + T_g S)(1 + T_g S)}{(1 + 10 T_g S)(1 + 10 T_g S)}\right]$$

which simplifies by pole, zero cancellation to:

$$F(s)g(s) = \frac{100 T_g^2 S^2}{(1 + 10 T_g S)(1 + 10 T_g S)} \quad \text{(VIII)}$$

The compensated response of the geophone is now exactly equivalent to that of a geophone having a resonant frequency that is ten times lower than the actual value. With the addition of the geophone compensator, the phase shift of the feedback signal takes place prior to the resonant frequency and motion amplification of the passive system, thus the entire control system now has low gain when the phase angle is close to ±180°, and high gain where the phase angle is close to 0°. The low gain, for example, has been maintained at less than 0.35 and the high gain at greater than 10.

The feedback circuit as analyzed for FIG. 2 was applied to the velocity force feedback system of FIG. 1 with further modifications as now will be described with reference to FIG. 3.

Figure 3:
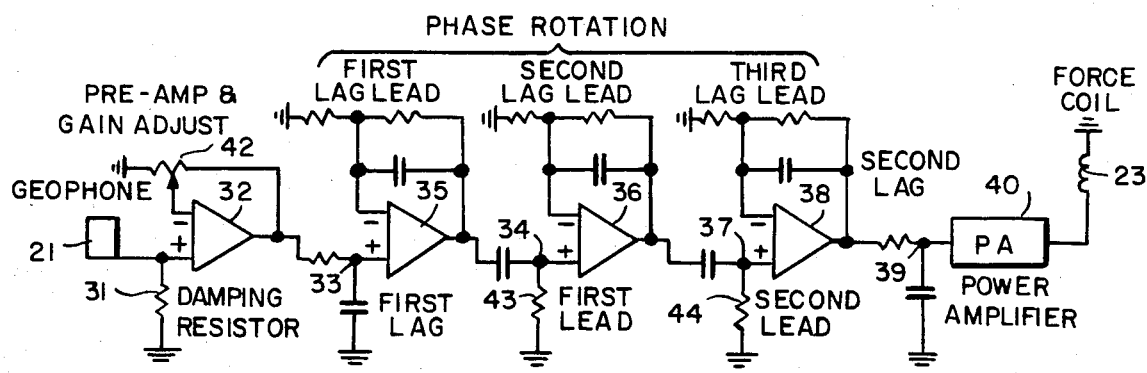
FIG. 3 is a schematic diagram of a complete feedback circuit for the system of FIG. 1.

In FIG. 3 the geophone 21 and the force actuator 23 are identified as the elements previously described in FIG. 1. The coil of the geophone 21 is connected across a damping resistor 31 as previously described. The damped output of the geophone 21 is one input to an operational amplifier 32 the output of which is applied to a potentiometer the top of which supplies the other input of operational amplifier 32 thereby controlling the gain of the velocity signal. The output of the gain control operational amplifier 32 is applied through a first-leg network 33 to a first lag-lead circuit 35 corresponding to circuit 25 of FIG. 2. The output of amplifier 35 is applied to a first lead network 34 which supplies an input to an operational amplifier 36 corresponding to amplifier 26 of FIG. 2. The output of amplifier 35 is passed through a second lead network 37 to a third lag-lead circuit 38 (similar to 35 and 36) the output of which passes through a second lag network 39. The output signal from network 39 is applied as the input to a power amplifier 40 which in turns drives the coil of the force transducer 23.

Figure 7:
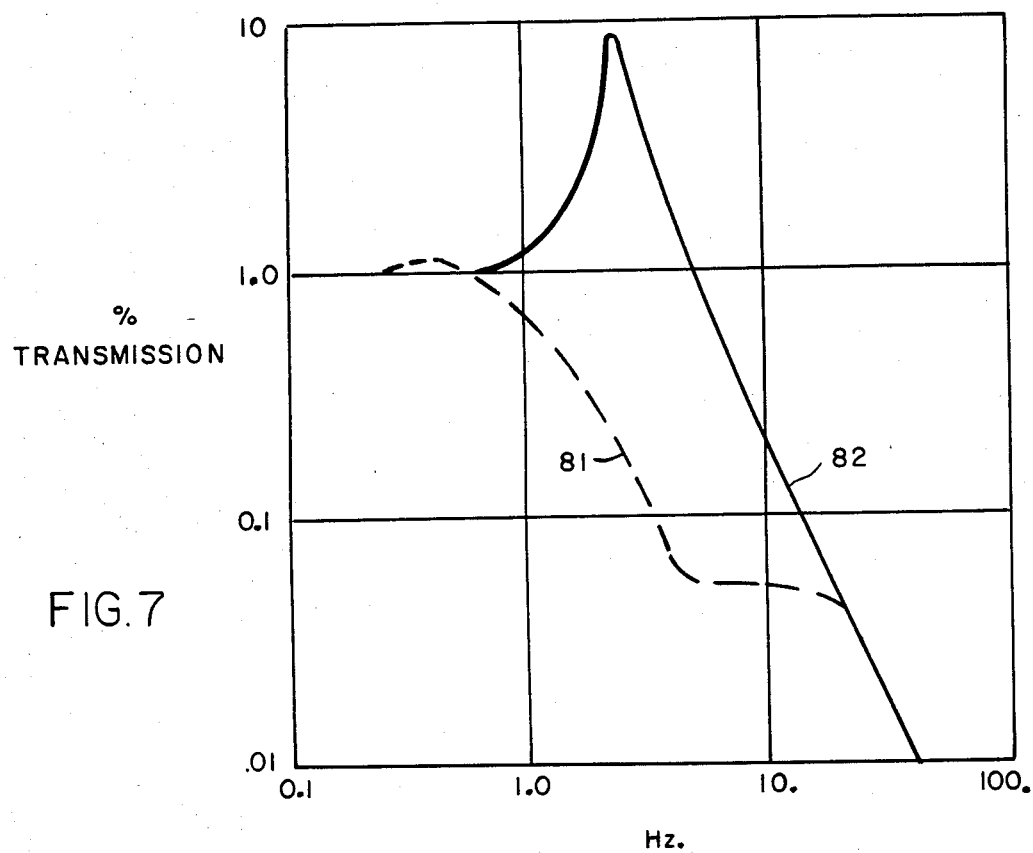
FIG. 7 is a transmissivity curve showing the passive resonant response and the response obtained with the active system of this invention in the embodiment of FIG. 6.

As can be seen in FIG. 3, the preferred feedback circuit includes three phase rotation elements. While the addition of geophone compensation shown in FIG. 2, provides for much more velocity feedback gain, it was experimentally found that the addition of a third lag-lead compensation stage 38 in FIG. 3 allows even more gain to be applied. Importantly, the additional phase rotation element maintains the overall control system resonance transmissibility to even smaller values, about 1.10 (as shown in FIG. 7), compared to the two element circuit.

The loop gain used in the control system is adjustable by means of potentiometer 42 and can be set such that the gain at a phase shift of ±180°, called the gain margin, is 0.35, and the phase shift at unity gain called the phase margin, is ±45° from ±180°. For this condition the basic system stability state is excellent. At high freuencies where minor resonances in some part of the entire system can cause gain amplification and near unstable conditions the lag networks 33 and 39 in the feedback loop lower the loop gain above 200 cycles per second. In addition the high DC gain associated with the lag-lead networks, which causes large DC offset voltages due to errors in the DC operating level of the operational amplifiers is avoided by the two lead networks 34 and 37 placed in series in the feedback loop to block DC and very low frequency signals.

Six Degree of Freedom System

Figure 4:
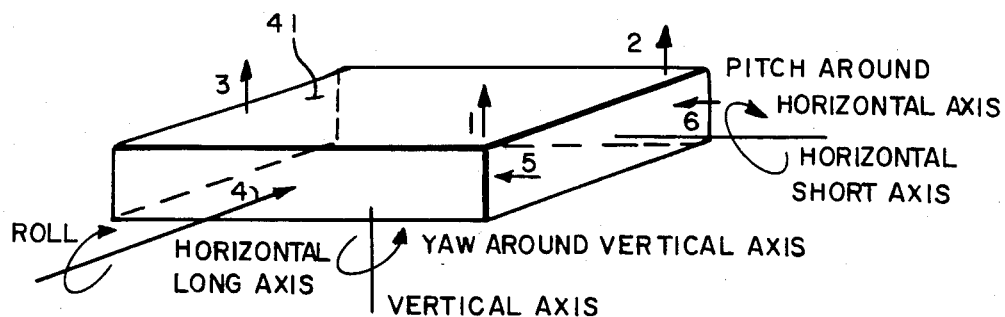
FIG. 4 is a representation of a mass supported for motion with six degrees of freedom with corresponding active force application for vibration control.

Referring to FIG. 4 a mass used as a platform 41 for vibration isolation has six degrees of freedom. These six degrees of freedom are shown in FIG. 4 as motion corresponding to vertical, roll, pitch, horizontal long axis, horizontal short axis, and yaw. All possible motions of the mass can be described by motions in these six degrees of freedom through translation along and rotation about the three mutually perpendicular axes.

Achievement of low vibration level for the platform 41 using an active vibration isolation system requires active vibration isolation controlling all six degrees of freedom. This may be done by using three independent translatory control systems and three independent rotational control systems. However, rotational control systems are hard to implement mechanically both from a sensor and actuator point of view. Thus, translatory control systems only are used to obtain the same goal of control of all six degrees of freedom. In FIG. 4 typical points of application for six linear force actuations, 1, 2, 3, 4, 5 and 6 are shown. Each force actuation results from an actuator and sensor combination and corresponds to a channel. In FIG. 4 channels 1 and 2 control part of the vertical axis, and all of the pitch axis. Channels 1, 2 and 3 control all of the vertical axis and all of the roll axis. Channel 4 controls all of the horizontal long axis and channels 5 and 6 combined control all of the horizontal short axis and all of the yaw axis.

Ideally, motions in any one axis are completely independent of other motions in other axes, such for example if a displacement occurs on the vertical axes 1, 2, 3 combined, no other motions or rotations occur on any other axis. This independence of degrees of freedom however, is nearly impossible to achieve in a real world system. In an actual system constructed, the three vertical channels are nearly independent in that a combined motion of channels 1, 2 and 3 generate almost pure vertical translation with little horizontal or rotational motion. Control of pitch and roll is also quite good, in that the combined motions of channels 1, 2 and 3 to generate a pitch or roll motion only will generate little motion in yaw or the two horizontal directions. However, motion generated by the actuators on channels 4, 5 and 6 generate axis coupling in that motion of channel 4 generates some pitch and motion by either channel 5 or 6 generates some roll as well as yaw motion. The location of the force actuators in the horizontal plane was selected to act at points on the payload mass that minimized the coupling effect.

Another form of coupling is caused by gravity and exists only on the horizontal channels. When a horizontal HS-1 geophone is exactly level with respect to gravity, there is no gravitational force acting in the horizontal direction. If, however, a roll or pitch motion takes place an acceleration component occurs in the nearly horizontal plane of the geophone sensitive axis.

For small angles of rotation A of the geophone sensitive axis, the sine of the angle A is nearly equal to the angle A itself or A=sin A. Thus the output of the geophone is dependent on the velocity motion sensed in its own plane plus some signals generated by gravity when rotations of a horizontal plane occur. In equation form, the actual geophone output, neglecting the geophone output dynamics becomes:

$$\text{Geophone output} = \frac{dx}{dt} + 386\, At \tag{IX}$$

This coupling effect causes stability problems for the horizontal channels because control motions of a vertical channel couple to horizontal sensors, when pitch or roll occurs, and causes false signals. Thus an interaction between vertical and horizontal channels exists due only to gravity, but which nevertheless must be dealt with. The solution chosen was to limit the low frequency response of the horizontal channels 4, 5 and 6 by the use of higher frequency DC blocking lead networks, 43, 44 of FIG. 3, having a higher resonant frequency, as well as a lower overall loop gain, as compared to the vertical channels, as will be understood by those skilled in the art.

Figure 5:
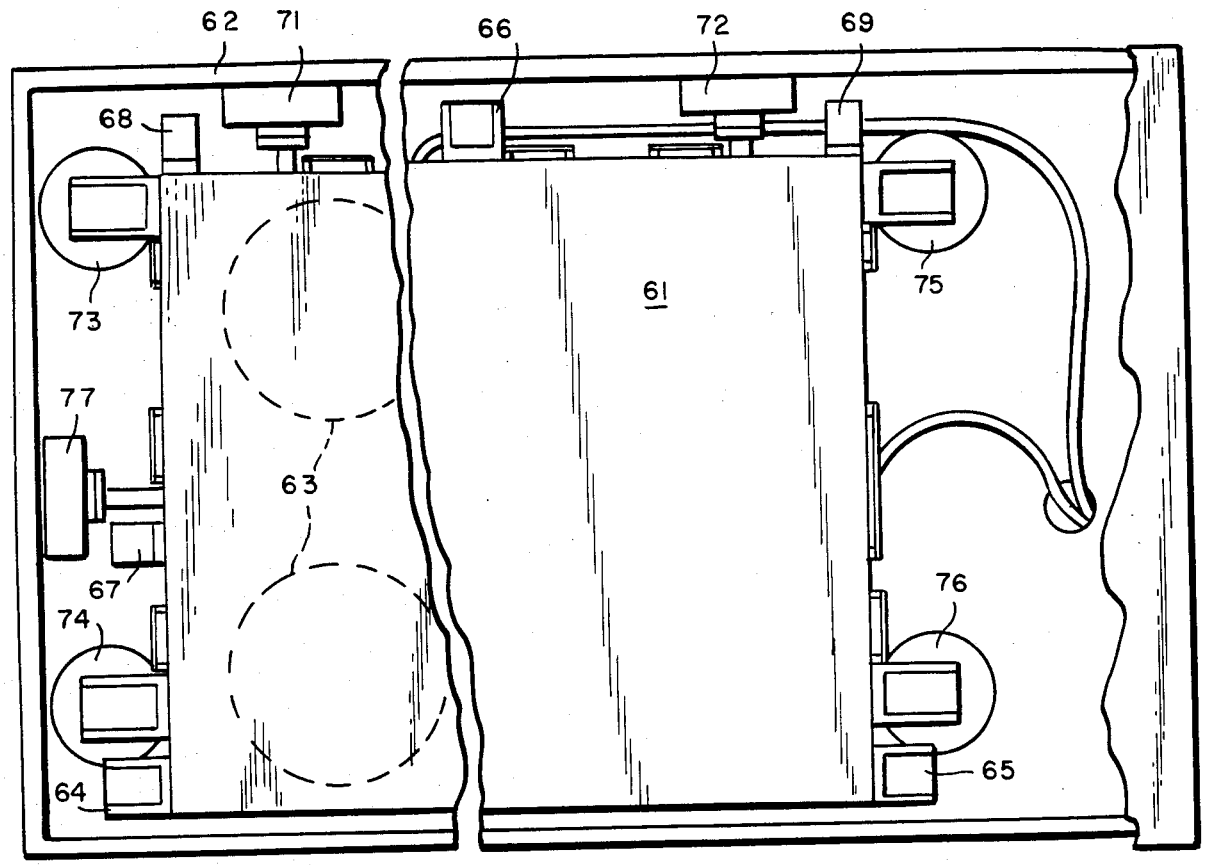
FIG. 5 is a top plan view of a platform having six degrees of freedom stabilized in accordance with the invention.
Figure 6:
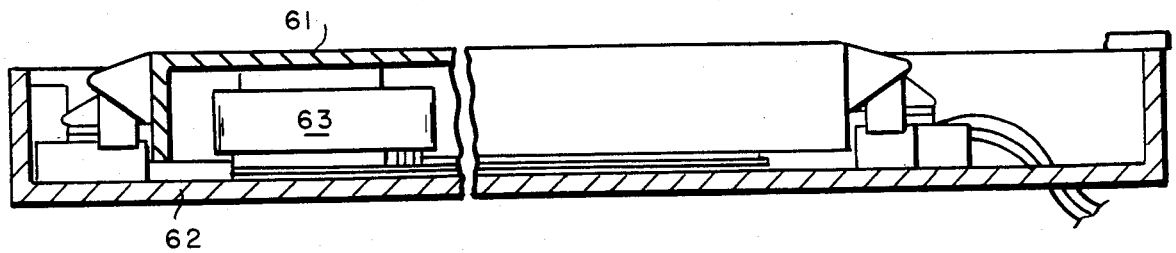
FIG. 6 is a elevation view partly in section of FIG. 6.

Referring now to FIGS. 5 and 6 the plan and elevation views of an embodiment of the invention with six degrees of freedom is shown. The payload is a table work surface 61 supported in a frame 62 by four passive but height regulated vibration isolation elements 63 located generally near the corners of the work table 61.

Six velocity sensing geophones 64, 65, 66, 67, 68 and 69 are mounted on the table 61 with their axes of motion sensing aligned to sense the individual components of the six degrees of freedom.

Mounted between the frame 62 and the table 61 are a plurality of force actuators of the type described with reference to FIG. 9. Thus as shown in FIG. 5 there are two actuators 71 and 72 positioned to control the short axis Y translation and yaw. There are four vertical force actuators 73, 74, 75 and 76 for controlling vertical motion and pitch and roll and there is an actuator 77 positioned to control long axis Y translation. It will be noted that their are seven force actuators in FIGS. 5 and 6, one more than that described with reference to FIG. 4. This merely represents allocating the signal response from the third channel motion between the two actuators 73 and 75 instead of the pivot motion indicated in FIG. 4. Thus actuators 73 and 75 operate jointly on the same signal which is modified relative to the signals described with the circuit of FIG. 5 in a manner which will be apparent to those skilled in the art.

Referring to FIG. 7 the transmissivity curve of the embodiment of the invention shown in FIG. 6 as measured is shown in curve 81 with a comparison curve 82 representing the transmissivity curve of the passive isolation system alone. As will be noted the curve 82 exhibits a natural resonance at approximately three Hz where the transmitted motion is actually amplified by a factor of almost 10. It is this phenomenon universal with passive systems which the present invention so effectively avoids. As seen in the curve 81, the resonance of the system has been reduced in frequency by approximately a factor of 10 occuring somewhere near 0.4 Hz and its amplitude is greatly reduced being approximately 1.1. Thereafter the attentuation provided by the active force velocity feedback system of the invention reduces the percent transmission well below 1.0 and in fact it is approximately 0.1 at the frequency of resonance of the passive system alone. The curve 81 represents the response with the passive and active systems both present and hence is the actual result achieved by the invention. As noted curve, 81 continues to reduce the percent transmission until it merges with the isolation provided by the passive system alone as indicated in curve 82 somewhere in the region of 30 Hz.

Figure 8:
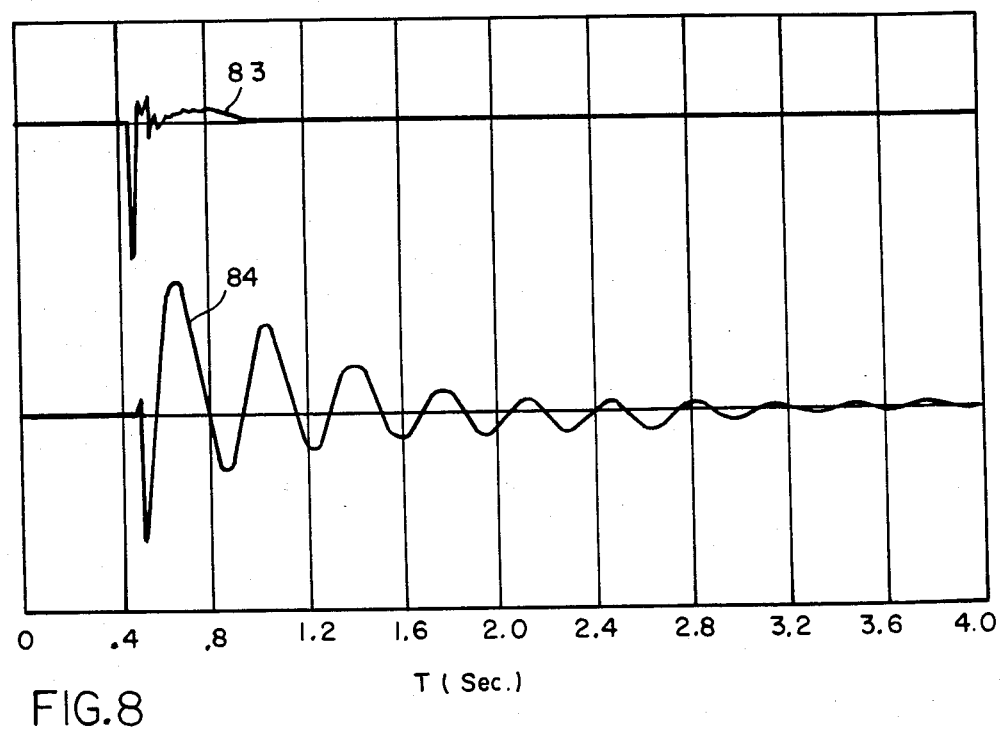
FIG. 8 is a response curve for an impact loading of the pay load in the system of FIG. 5.

Referring to FIG. 8 a typical example of the results achieved with the embodiment of the invention described in FIG. 6 is shown. The top curve 83 shown in FIG. 8 represents the response of the combined passive and active system of the invention to a 1.5 inch-pound impact load such as drop of a rubber ball on a 50 pound payload of FIG. 5. the curve 84 shown in FIG. 8 represents the response of the passive system alone to the same impact loading. Note that the initial deflection is approximately the same for curves 83 and 84 but that the recovery time with the active system operating as indicated in curve 83 is much shorter and of substantially lower amplitude than the oscillatory deflection shown in curve 84. As can be seen from curve 83, a vibration isolation system made in accordance with the present invention exhibits a fast settling time resulting from the large damping forces generated by the feedback. The increased system damping not only results in superior vibration isolation compared with typical passive systems, but also greatly reduces the system payload response motions resulting from external forces applies to the payload.

Alternative Embodiment

Figure 10:
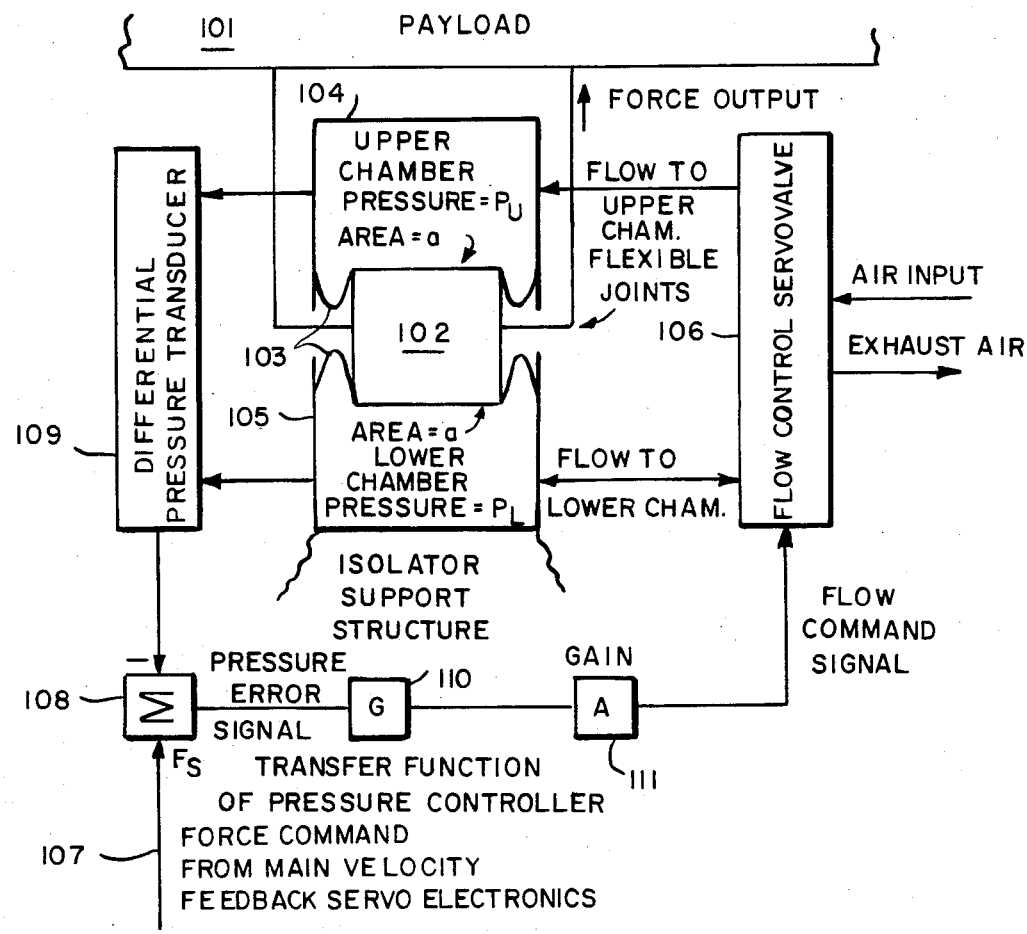
FIG. 10 is a schematic diagram of the application of the invention to a pneumatic force servo system.

Whenever a payload is of such character that it requires a force of more than approximately 2 pounds to counteract externally applied forces, the use of electromagnetic force transducers such as described with reference to FIG. 9 become expensive and ultimately impractical. Other types of force actuation means can be substituted without departing from the scope of the invention. In FIG. 10 a pneumatic system is shown wherein a payload 101 is supported from a piston 102 which is freely suspended from diaphragms 103 in an upper and lower pressure cylinders 104, 105.

The pressure within the cylinders 104, 105 operates on the equal upper and lower area surfaces of the piston 102 to apply the motion of the piston 102 to the payload 101. This pressure is controlled by a flow control servovalve 106 which applies differential pressure to the piston 102 to move same.

The flow control servovalve 106 is controlled by a servo system comprising a force command signal input at line 107 corresponding to the final velocity sensor signal which is compared in a differential summing device 108 with a signal representing the differential pressure in the cylinders 104 and 105 obtained from a differential pressure transducer 109. Any deviation in position called for by the velocity signal on line 107 relative to the position established by the differential pressure sensed by unit 109 results in an error signal output which is applied to a transfer function device 111 and pneumatic amplifier 112 to control the servovalve 106. The system of FIG. 10 thus applies force from the piston 102 to the payload 101 in accordance with the requirements of the velocity signal on line 107 to achieve the results described in the present invention where higher values of force are required.

While the invention has been described by reference to specific embodiments, it will be apparent to those skilled in the art that the invention can be applied to a wide variety of vibration isolation and control systems.

I claim:

1. A vibration isolation system comprising:
   a payload mass;
   a support;
   a passive isolation system for supporting said payload mass on said support;
   a velocity transducer for sensing vibrational movement of said payload mass relative to said support and for producing a velocity transducer output signal that varies as a function of the velocity of said payload mass as it undergoes vibrational motion relative to said support;
   control circuit means responsive to said velocity transducer output signal for modifying said velocity transducer output signal so that the effective resonant frequency of said velocity transducer is substantially lower than the resonant frequency of said passive isolation system;
   a force transducer for applying a force to said payload mass in response to an input signal; and
   signal applying means for applying said modified velocity transducer output signal as said input signal to said force transducer so as to cause said force transducer to apply a force to said payload mass in a direction opposite to the direction of movement of said mass as it vibrates.

2. A vibration isolation system according to claim 1 wherein said control circuit means modifies said velocity transducer output signal so that the effective resonant frequency of said velocity transducer is lower than the resonant frequency of said passive isolation system by at least one decade.

3. A vibration isolation system according to claim 1 wherein said control circuit means and said signal applying means form a feedback loop having a feedback gain of substantially zero at dc.

4. A vibration isolation system according to claim 3 wherein said feedback loop has a relatively small feedback gain at frequencies above 200 Hz.

5. A vibration isolation system according to claim 1 wherein said control circuit means and said signal applying means form a negative feedback loop between said velocity transducer and said force transducer, and said loop is characterized by a gain of substantially zero at dc and at frequencies above about 200 Hz.

6. A vibration isolation system according to claim 1 wherein said control circuit means comprises at least two series-connected lag-lead stages for controlling signal gain and phase as a function of frequency.

7. A vibration isolation system according to claim 6 wherein each lag-lead stage comprises an operational amplifier having first and second input terminals and an output terminal, a lag-lead feedback network coupling its output terminal to its first input terminal, and further including means for applying the output signal of said velocity transducer to the second input terminal of the operational amplifier of the first in series of said lag-lead stages; and further wherein said signal applying means is arraged to couple the output signal appearing on the output terminal of the operational amplifier of the last in series of said lag-lead stages to input terminal of said force transducer.

8. A vibration isolation system according to claim 7 wherein said control circuit means comprises three of said lag-lead stages.

9. A vibration isolation system according to claim 1 wherein said velocity transducer is a geophone.

10. A vibration isolation system according to claim 9 wherein said geophone comprises a case, a proof mass suspended in said case, and means for sensing the velocity of said proof mass relative to said case and for producing said velocity transducer output signal, and further including means for applying said velocity transducer output signal to said control circuit means, and a resistor connected between said last-mentioned means and ground for damping said velocity transducer output signal, said resistor having a value such that the overall fraction of critical damping is unity.

11. A vibration isolation system according to claim 1 wherein said force transducer is an electromatnetic device and comprises a speaker magnet voice coil assembly having a first magnetic structure defining an annular air gap and a second coil-supporting structure mounted in said air gap so as to permit substantially frictionless relative motion between said first and second structures in response to said modified velocity transducer output signal.

12. A vibration isolation system comprising:
a payload;
a support;
a passive isolation system for supporting said payload on said support;
a geophone disposed so as to sense vibrational movement of said payload relative to said support, said geophone comprising a case, a proof mass suspended within the case, and means for measuring the relative velocity of the proof mass relative to the case and for producing an output signal that is proportional to said relative velocity by the expression S(X−Z), where S is the Laplace operator, X is the displacement of the case relative to said support, and Z is the displacement of the proof mass as the payload undergoes vibrational movement;
circuit means coupled to said geophone for modifying said geophone output signal so that it is more nearly proportional to the actual velocity shown by the expression SX of said case and payload;
a force transducer for applying a force to said payload in response to an input signal; and
means for applying said modified geophone output signal as an input signal to said force transducer so as to cause said force transducer to apply a force to said payload in a direction in opposition to the direction of movement of said payload as it vibrates.

13. A vibration isolation system according to claim 12 wherein said circuit means modifies said geophone output signal so that the effective resonant frequency of said geophone is lower than the resonant frequency of said passive isolation system by at least one decade.

14. A vibration isolation system comprising:
a payload mass;
a support;
a passive isolation system supporting said payload mass on said support;
a geophone for sensing vibrational movement of said payload mass relative to said support and for producing an output signal in response to said movement, said geophone comprising a case adapted to vibrate with said payload mass, a proof mass suspended in said case so as to be capable of displacement relative to said case as said case undergoes vibrational movement, and means for measuring said relative displacement and providing in response thereto a geophone output signal that is represented approximately by the following equation using Laplacian notation:

$$E_v(s) = \beta_s(X - Z) = \beta \left[ \frac{S^2}{(S + w_g)(S + w_g)} \right] \dot{X} \text{ for } \zeta_g = 1.0$$

where $E_v(s)$ represents the geophone transfer function, $\beta$=gain in units of volts per inch per second, S=the Laplace operator, X is the displacement of the geophone case, Z is the displacement of the proof mass, S(X−Z) is the relative velocity of the proof mass relative to the geophone case, $\zeta_g$ is the geophone fraction of critical damping, and $w_g$ is the proof mass resonant frequency;
control circuit means responsive to said geophone output signal for modifying said geophone output signal so that the effective resonant frequency of said geophone is lower than the resonant frequency of said passive isolation system by at least one decade;
a force transducer for applying a force to said payload mass in response to an input signal; and
means for applying said modified geophone output signal as an input signal to said force transducer so as to cause said force transducer to apply a force to said payload mass in a direction in opposition to the direction of movement of said payload mass as it vibrates.

15. A vibration isolation system according to claim 14 wherein said control circuit means has a transfer function which is approximately as follows:

$$g(s) = \left( \frac{10T_g}{T_g} \right)^2 \left[ \frac{1 + T_g S}{1 + 10T_g S} \right]^2$$

where:
g(s) is the transfer function of said control circuit means,
$w_g$ is the geophone resonant frequency,
S is the Laplace operator and
$T_g$ is a time constant=

$$\frac{1}{w_g}.$$

16. A vibration isolation system according to claim 15 wherein said circuit means modifies said geophone output signal so that the effective resonant frequency of said geophone is lower than the resonant frequency of said passive isolation system by at least one decade;

17. A vibration isolation system according to claim 15 wherein said circuit means comprises a plurality of leg-lead amplifier stages adapted to provide substantially zero gain at dc and high gain greater than unity at the frequencies of said vibrational motion except that the gain is substantially less than unity for all frequencies at open loop phase angles of ±180 degrees.

18. A vibration isolation system comprising:
a payload mass;
a support means supporting said payload mass so that said payload mass is subject to vibrational motion and will respond to application of a force opposing said vibrational motion, said support means comprising a passive isolation system;
a geophone for sensing vibrational movement of said mass relative to said support and for producing a transducer output signal that varies as a function of the velocity of said payload mass as it undergoes vibrational motion relative to said support;
circuit means responsive to said geophone output signal for modifying said geophone output signal;
an electromagnetic force transducer for applying a force to said payload mass in response to an input signal; and
means for applying said modified geophone output signal as an input signal to said force transducer so as to cause said force transducer to apply a force to said payload mass in a direction in opposition to the direction of movement of said payload mass as it vibrates;

said circuit means being adapted to modify the output signal of said geophone so as to as to provide a compensated geophone transfer function represented as follows:

$$F(s)g(s) = \frac{100T_g^2S^2}{(1 + 10T_gS)(1 + 10T_gS)}$$

where:

F(s) is the geophone transfer function, g(s) is the transfer function of said circuit means, $T_g$ is the geophone time constant, and S is the Laplace operator.

19. An active vibration isolation system comprising:

a payload mass supported so as to be subject to vibrational motion and to respond to application of a force opposing said vibrational motion;

a geophone for producing a velocity signal in response to vibrational motion of said payload mass;

an electrically operated force transducer for applying a force to said payload mass in response to an input signal;

circuit means responsive to said velocity signal for producing a control signal that provides a compensated geophone transfer function as follows:

$$F(s)g(s) = \frac{100T_g^2S^2}{(1 + 10T_gS)(1 + 10T_gS)}$$

where F(s) is the transfer function of the geophone, g(s) is the transfer function of the circuit means, $T_g=$ is the time constant for the geophone, and S is the Laplace operator; and means for applying said control signal as an input signal to said force transducer.

20. A system according to claim 19 wherein said payload mass is supported by a passive vibration isolation means.

21. A system according to claim 20 wherein said circuit means modifies said velocity signal so as to lower the effective resonant frequency of said geophone to approximately a decade below the resonant frequency of said passive vibration isolation means.

22. A system according to claim 19 wherein said circuit means modifies said velocity signal so that effectively the response of said geophone is equivalent to that of a geophone having a resonant frequency about 10 times lower than the resonant frequency of said first-mentioned geophone.

23. An active vibration control system for a payload that is supported relative to a supporting structure and is subject to undesirable vibration in a plurality of degrees of freedom comprising:

a plurality of geophones mounted on said payload, each of said geophones being oriented to sense a velocity component of said payload in a predetermined one of several degrees of freedom and adapted to produce a geophone electrical output signal that varies as a function of the velocity component in said predetermined one degree of freedom;

a plurality of force actuators each operable in response to an individual input signal for applying a force to said payload in opposition to vibrational motion of said payload in one of said degrees of freedom;

a plurality of channel circuit means each adapted to produce a channel electrical output signal in response to an input signal;

a plurality of means for applying said geophone output signals as input signals to said channel circuit means; and means for applying said channel output signals to said force actuators;

said channel circuit means being adapted to modify said geophone output signals so that each of said channel circuit means output signals provides a compensated geophone transfer function that is represented approximately as follows:

$$F(s)g(s) = \frac{100T_g^2S^2}{(1 + 10T_gS)(1 + 10T_gS)}$$

where F(s) is the transfer function of one of said geophones, g(s) is the transfer function of the channel circuit means to which the output signal of said one geophone is applied, $T_g=$ is the time constant for said one geophone, and S is the Laplace operator.

24. A system according to claim 23 wherein each of said channel circuit means effectively lowers the natural resonant frequency of one of said geophones to approximately a decade below the natural resonant frequency of said passive vibration isolation means.

25. A system according to claim 23 wherein each of said channel circuit means modifies the output signal of one of said geophones so that it is equivalent to the signal produced by a geophone having a resonant frequency approximately ten time less than the actual resonant frequent of said one geophone.

26. A system according to claim 23 wherein each of said channel circuit means comprises a plurality of lag-lead amplifier stages for controlling gain and phase as a function of frequency.

27. A system according to claim 23 wherein said payload is supported on said base by a plurality of passive vibration isolation systems so that said payload has said several degrees of freedom.

28. A system according to claim 27 wherein said channel circuit means effectively lower the natural resonant frequency of said geophones to approximately a decade below the natural resonant frequency of said passive vibration isolation means.

29. A system according to claim 23 wherein said force transducers are electromagnetic devices.

* * * * *